United States Patent
Komori (10) Patent No.: US 8,055,062 B2
(45) Date of Patent: Nov. 8, 2011

(54) INFORMATION PROCESSING APPARATUS, INFORMATION PROCESSING METHOD, AND PROGRAM

(75) Inventor: Yoko Komori, Kanagawa (JP)

(73) Assignee: Sony Corporation (JP)

( * ) Notice: Subject to any disclaimer, the term of this patent is extended or adjusted under 35 U.S.C. 154(b) by 543 days.

(21) Appl. No.: 12/291,190

(22) Filed: Nov. 6, 2008

(65) Prior Publication Data

US 2009/0123062 A1 May 14, 2009

(30) Foreign Application Priority Data

Nov. 13, 2007 (JP) ................................ P2007-294313

(51) Int. Cl.
*G06K 9/62* (2006.01)

(52) U.S. Cl. ......... 382/159; 382/224; 715/200; 704/245

(58) Field of Classification Search .................. 382/159, 382/173, 224, 228, 305; 715/723, 200, 255, 715/256; 704/245
See application file for complete search history.

(56) References Cited

U.S. PATENT DOCUMENTS

| | | | |
|---|---|---|---|
| 6,714,594 B2 * | 3/2004 | Dimitrova et al. | 375/240.16 |
| 7,065,250 B1 * | 6/2006 | Lennon | 382/224 |
| 7,490,287 B2 * | 2/2009 | Sakurai | 715/200 |
| 2010/0017381 A1 * | 1/2010 | Watson et al. | 707/4 |

OTHER PUBLICATIONS

N. Huu Bach, K. Shinoda and S. Furui, "Automatic Video Indexing of Baseball Broadcase Using a Hidden Markov Model", *The Institute of Electronics, Information and Communication Engineers, Technical Report of IEICE*, pp. 1-6, Jul. 2005.

* cited by examiner

*Primary Examiner* — Hoa Pham
(74) *Attorney, Agent, or Firm* — Lerner, David, Littenberg, Krumholz & Mentlik, LLP (57) ABSTRACT

Disclosed herein is an information processing apparatus configured to classify time-series input data into N classes, including, a time-series feature quantity extracting section, N calculating sections, and a determination section.

7 Claims, 8 Drawing Sheets

INFORMATION PROCESSING APPARATUS, INFORMATION PROCESSING METHOD, AND PROGRAM

CROSS REFERENCES TO RELATED APPLICATIONS

The present application claims priority from Japanese Patent Application No. JP 2007-294313, filed in the Japanese Patent Office on Nov. 13, 2007, the entire content of which is incorporated herein by reference.

BACKGROUND OF THE INVENTION

1. Field of the Invention

The present invention relates to an information processing apparatus, an information processing method, an a program and, more particularly, to an information processing apparatus, an information processing method, and a program that are suitably for use in the identification of video contents of video data represented by television programs, for example.

2. Description of the Related Art

For example, methods are proposed for identifying the video contents in order to automatically generate digests of television programs and automatically extract highlight scenes.

The video contents of time-series video data of television programs for example are identified by a method that uses one of probabilistic models, or HMM (Hidden Markov Model) that is able to use time-series data as a target of processing (refer to "Automatic Indexing for Baseball Broadcast based on Hidden Markov Model," Image Recognition and Understanding Symposium (MIRU2005), July 2005 by Nguyen Huu Back, Koichi Shinoda, Sada Furui, hereinafter referred to as Non-Patent Document 1 for example)

Non-Patent Document 1 describes a method of identifying the video contents of baseball live coverage by use of HMM. To be specific, the HMMs corresponding to the video contents (for example, pitching scene, homerun scene, infield grounder scene, walking scene, strikeout scene, and so on) of a baseball live coverage are generated by learning in advance and the video data of a baseball live coverage is supplied to each learned HMM, thereby recognizing a scene corresponding to the HMM having a largest output likelihood value, as the video contents of the baseball live coverage.

Each HMM outputs a likelihood value that the video data to be entered is indicative of a corresponding scene. For example, the HMM corresponding to a homerun scene outputs a likelihood value that the video data to be entered is indicative of a homerun scene.

SUMMARY OF THE INVENTION

Related-art video identification techniques based on the above-mentioned HMM can recognize video contents. However, these related-art techniques sometimes involve the erroneous recognition of video contents, thereby requiring a novel technique that is capable of identifying video contents with higher accuracy than before.

Therefore, the present invention addresses the above-identified and other problems associated with related-art methods and apparatuses and solves the addressed problems by providing an information processing apparatus, an information processing method, and a computer program that are capable of identifying video contents with higher accuracy.

According to an embodiment of the present invention there is provided an information processing apparatus configured to classify time-series input data into N classes. This above-mentioned information processing apparatus has time-series feature quantity extracting means for extracting a time-series feature quantity of the time-series input data; N calculating means for calculating, by applying the extracted time-series feature quantity to a probabilistic model learned in advance, likelihood values that the time-series input data belongs to any one of the N classes; and determination means for determining, by applying one of patterns of N dimension and dimensions higher than N that includes the calculated N likelihood values to pattern identification sections learned in advance, whether the time-series input data belongs to which of the N classes.

In the above-mentioned information processing apparatus, the time-series input data is video data and the N classes are scenes of N different types that are video contents of the video data.

The information processing apparatus further has non-time-series feature quantity extracting means for extracting a non-time-series feature quantity of the time-times input data. In this information processing apparatus, the determination means, by applying (N+M)-dimension patterns including the N calculated likelihood values and M extracted non-time-series feature quantities to a pattern identification section learned in advance, determines whether the time-series input data belongs to which of the N classes.

In the above-mentioned processing apparatus, the probabilistic model is a Hidden Markov Model and the pattern identification section is a neural network.

According to another embodiment of the present invention there is provided an information processing method for an information processing apparatus configured to classify time-series input data into N classes. The above-mentioned information processing method has the steps of: extracting a time-series feature quantity of the time-series input data; calculating, by applying the extracted time-series feature quantity to a probabilistic model learned in advance, likelihood values that the time-series input data belongs to any one of the N classes; and determining, by applying one of patterns of N dimension and dimensions higher than N that includes the calculated N likelihood values to pattern identification sections learned in advance, whether the time-series input data belongs to which of the N classes.

According to still another embodiment of the present invention, there is provided a program for controlling an information processing apparatus configured to classify time-series input data into N classes. The above-mentioned program has the steps of: extracting a time-series feature quantity of the time-series input data; calculating, by applying the extracted time-series feature quantity to a probabilistic model learned in advance, likelihood values that the time-series input data belongs to any one of the N classes; and determining, by applying one of patterns of N dimension and dimensions higher than N that includes the calculated N likelihood values to pattern identification sections learned in advance, whether the time-series input data belongs to which of the N classes.

According to an embodiment of the present invention, a time-series feature quantity of time-series input data is extracted. The extracted time-series feature quantity is applied to a probabilistic model that has been learned in advance to calculate a likelihood value that the time-series input data belongs to any one of N classes. In addition, patterns of N or higher dimensions including the calculated N classes are applied to pattern identification sections that have been learned in advance to determine whether the time-series input data belong to which of the N classes.

Embodiments of the present invention allow the classification of time-series input data with significantly high accuracy.

DETAILED DESCRIPTION OF THE PREFERRED EMBODIMENTS

This invention will be described in further detail by way of embodiments thereof with reference to the accompanying drawings.

Figure 1:
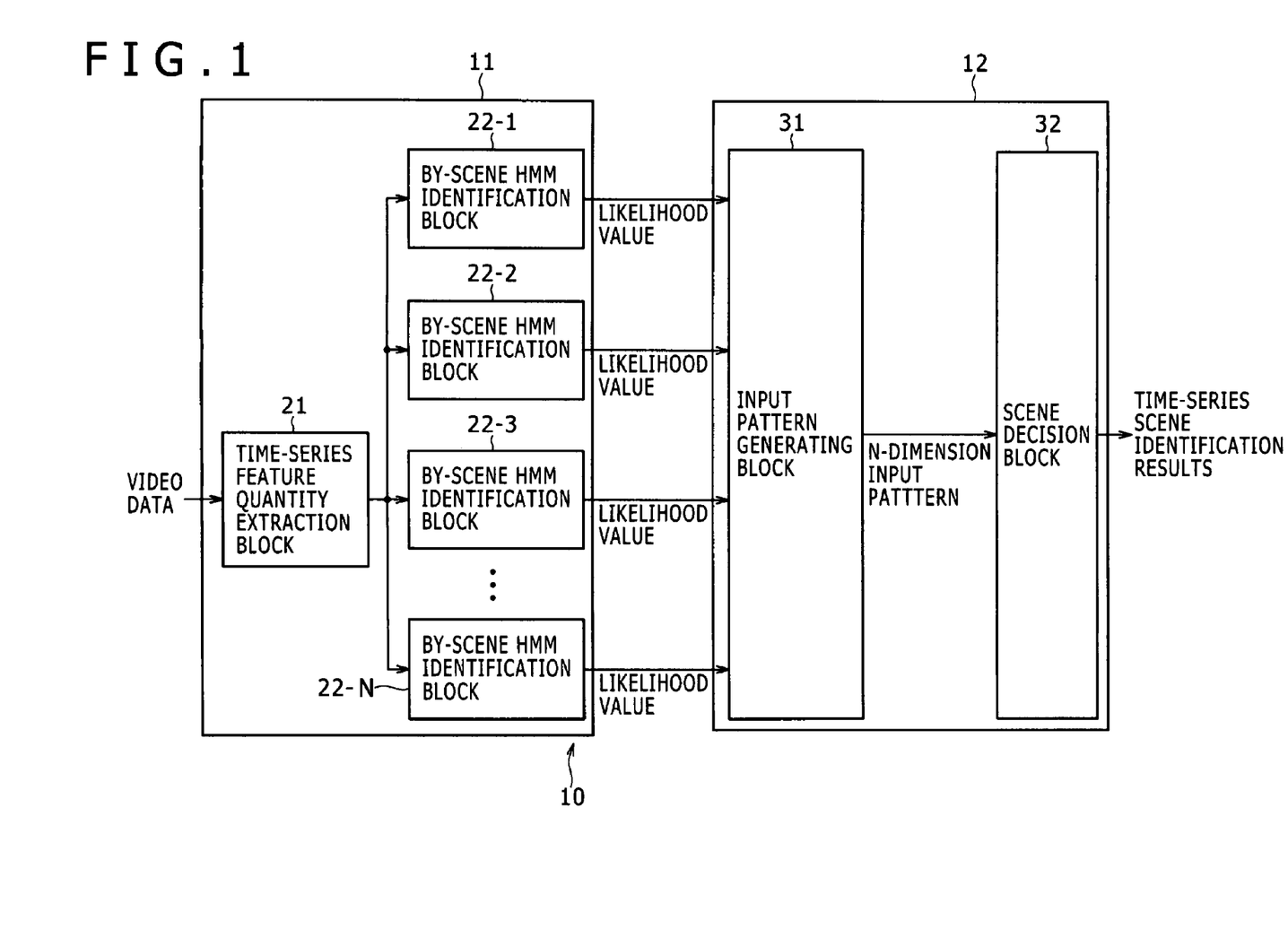
FIG. 1 is a block diagram illustrating a first exemplary configuration of a video data identification apparatus practiced as one embodiment of the invention.

Now referring to FIG. 1, there is shown an exemplary configuration of a video data identification apparatus practiced as a first embodiment of the invention. This video data identification apparatus 10 processes video data, such as television programs that are entered in a time-series manner, identifying the time-series data of video contents of entered video data. The video data identification apparatus 10 is made up of a time-series identification section 11 and a pattern identification section 12.

The following describes the identification of video contents (a pitching scene, a homerun scene, an infield grounder scene, a walking scene, a strikeout scene, and so on) of the video data of a baseball live coverage program, for example.

The time-series identification section 11 is configured to identify video data by use of HMM for example and is made up of a time-series feature quantity extraction block 21 and a plurality of by-scene HIM identification blocks 22-1 through 22-N.

The time-series feature quantity extraction block 21 divides video data into predetermined intervals (for example, several seconds or several frames) and extracts feature quantities based on move quantity, image histogram and main component analysis, a fractal feature quantity, and an inter-frame luminance difference feature quantity, for example. The extracted time-series feature quantities are supplied to the by-scene HMM identification blocks 22-1 through 22-N.

The by-scene HMM identification block 22-1 computes a likelihood value that a time series feature quantity (to be described later) was learned in advance in correspondence with one scene (a pitching scene for example) supposed as the video contents of video data and a time-series feature quantity entered from the time-series feature quantity extraction block 21 is that of a corresponding scene (a pitching scene in this case).

The by-scene HMM identification block 22-2 computes a likelihood value that a time series feature quantity (to be described later) was learned in advance in correspondence with one scene (a homerun scene for example) supposed as the video contents of video data and a time-series feature quantity entered from the time-series feature quantity extraction block 21 is that of a corresponding scene (a homerun scene in this case).

Likewise, the by-scene HMM identification blocks 22-3 through 22-N compute a likelihood value that a time series feature quantity (to be described later) was learned in advance in correspondence with different scenes supposed as the video contents of video data and time-series feature quantities entered from the time-series feature quantity extraction block 21 is those of corresponding scenes.

Therefore, the time-series identification section 11 outputs N-types of likelihood values as information indicative whether the video contents of entered video data are supposed N-types of scenes or not.

The pattern identification section 12 executes pattern recognition by use of a neural network (hereafter also referred to as NN) and is made up of an input pattern generating block 31 and a scene decision block 32.

The input pattern generating block 31 generates an N-dimension input patterns on the basis of N likelihood values entered from the by-scene HMM identification blocks 22-1 through 22-N of the time-series identification section 11 and outputs the generated input patterns to the scene decision block 32. The previously learned scene decision block 32 computes the likelihood values of the N-types of scenes of the N-dimension input patterns supplied from the input pattern generating block 31 and outputs a scene corresponding to the greatest of the obtained values as a video content recognition result. It should be noted that the learning of the scene decision block 32 can be made by a back propagation algorithm for example by use of learning video data (with time-series scenes identified by man).

Figure 2:
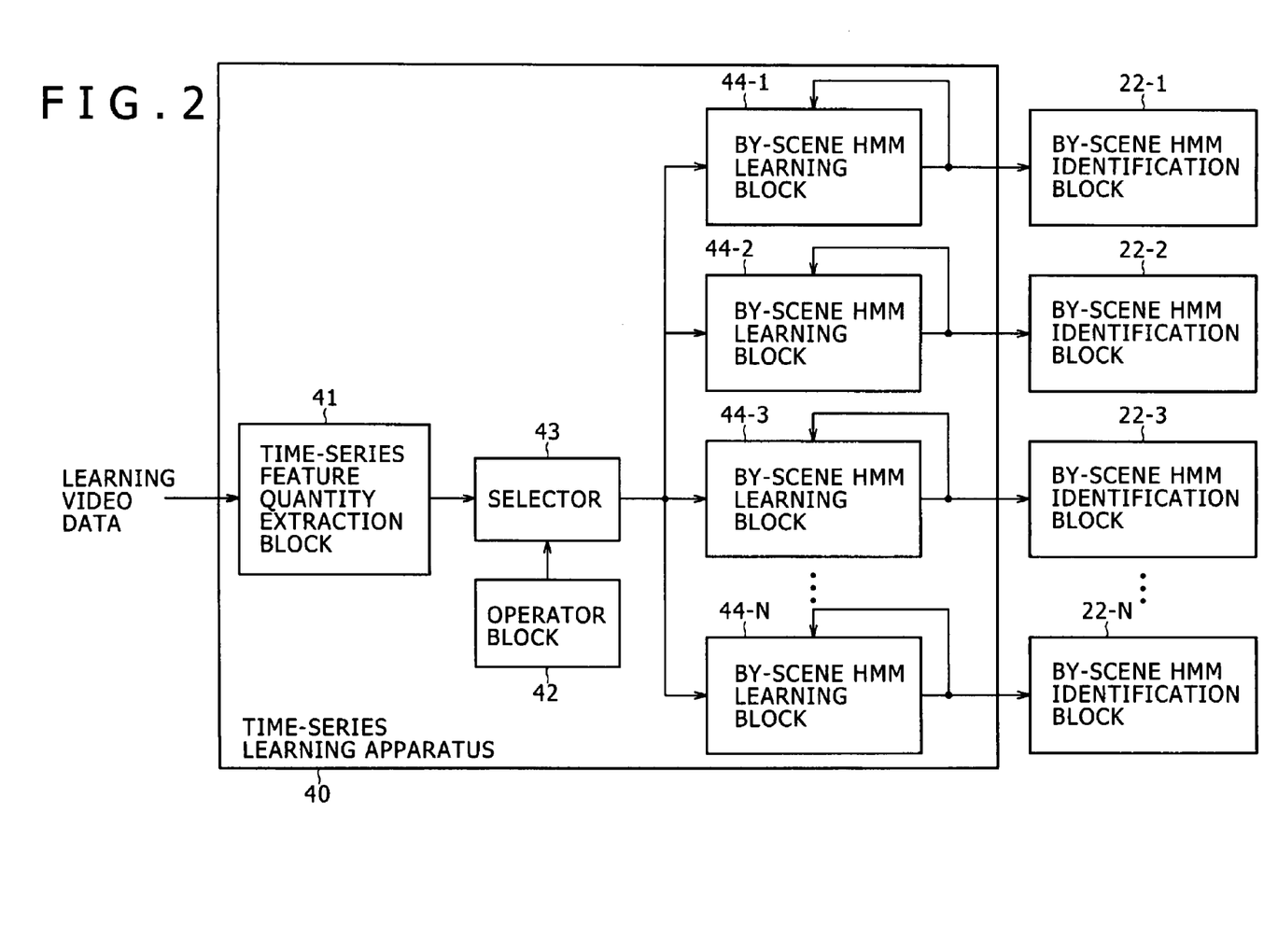
FIG. 2 is a block diagram illustrating an exemplary configuration of a time-series learning apparatus configured to make a by-scene HMM identification block shown in FIG. 1 learn.

Referring to FIG. 2, there is shown an exemplary configuration of a time-series learning apparatus 40 for learning the by-scene HMM identification blocks 22-1 through 22-N shown in FIG. 1 by use of learning video data.

The time-series learning apparatus 40 is made up of a time-series feature quantity extraction block 41, an operator block 42, a selector 43, and by-scene HMM learning blocks 44-1 through 44-N.

The time-series feature quantity extraction block 41, like the time-series feature quantity extraction block 21 shown in FIG. 1, divides video data into predetermined intervals (for example, several seconds or several frames) and extracts feature quantities based on move quantity, image histogram and main component analysis, a fractal feature quantity, and an inter-frame luminance difference feature quantity, for example, and outputs the extracted feature quantities to the selector 43.

The operator block 42 is operated by an operator (or a user) who identify learning video data scenes for example. A scene identification result is supplied to the selector 43 through the operator block 42. In response to the scene identification result supplied from the operator through the operator block 42, the selector 43 supplies a time-series feature quantity supplied from the time-series feature quantity extraction block 41 to one of the by-scene HMM learning blocks 44-1 through 44-N. It should be noted that the by-scene HMM learning blocks 44-1 through 44-N are respectively related to different video contents (a pitching scene, a homerun scene, an infield grounder scene, a walking scene, a strikeout scene, and so on).

For example, assume that the by-scene HMM learning block 44-1 is related to a pitching scene, the by-scene HMM learning block 44-2 is related to a homerun scene, and the by-scene HMM learning block 44-3 is related to an infield grounder scene. Then, if the video contents of learning video data is identified by the operator to be a homerun scene and the operator block 42 is operated accordingly, the selector 43 supplies the time-series feature quantity of that scene to the by-scene HMM learning block 44-2. If the video contents of learning video data is identified by the operator to be an infield grounder scene and the operator block 42 is operated accordingly, the selector 43 supplies the time-series feature quantity of that scene to the by-scene HMM learning block 44-3.

The by-scene HMM learning block 44-1 through 44-N learn HMM on the basis of the time-series feature quantity supplied via the selector 43. For this learning, the Baum-Welch algorithm can be used. Then, the learning is repeatedly executed by use of two or more different learning video data until the identification by the by-scene HMM learning blocks 44-1 through 44-N has reached a desired accuracy. When the identification is found reaching a desired accuracy, the final HMM of the by-scene HMM learning blocks 44-1 through 44-N is applied to the by-scene HMM identification blocks 22-1 through 22-N of the time-series identification section 11 shown in FIG. 1.

Figure 3:
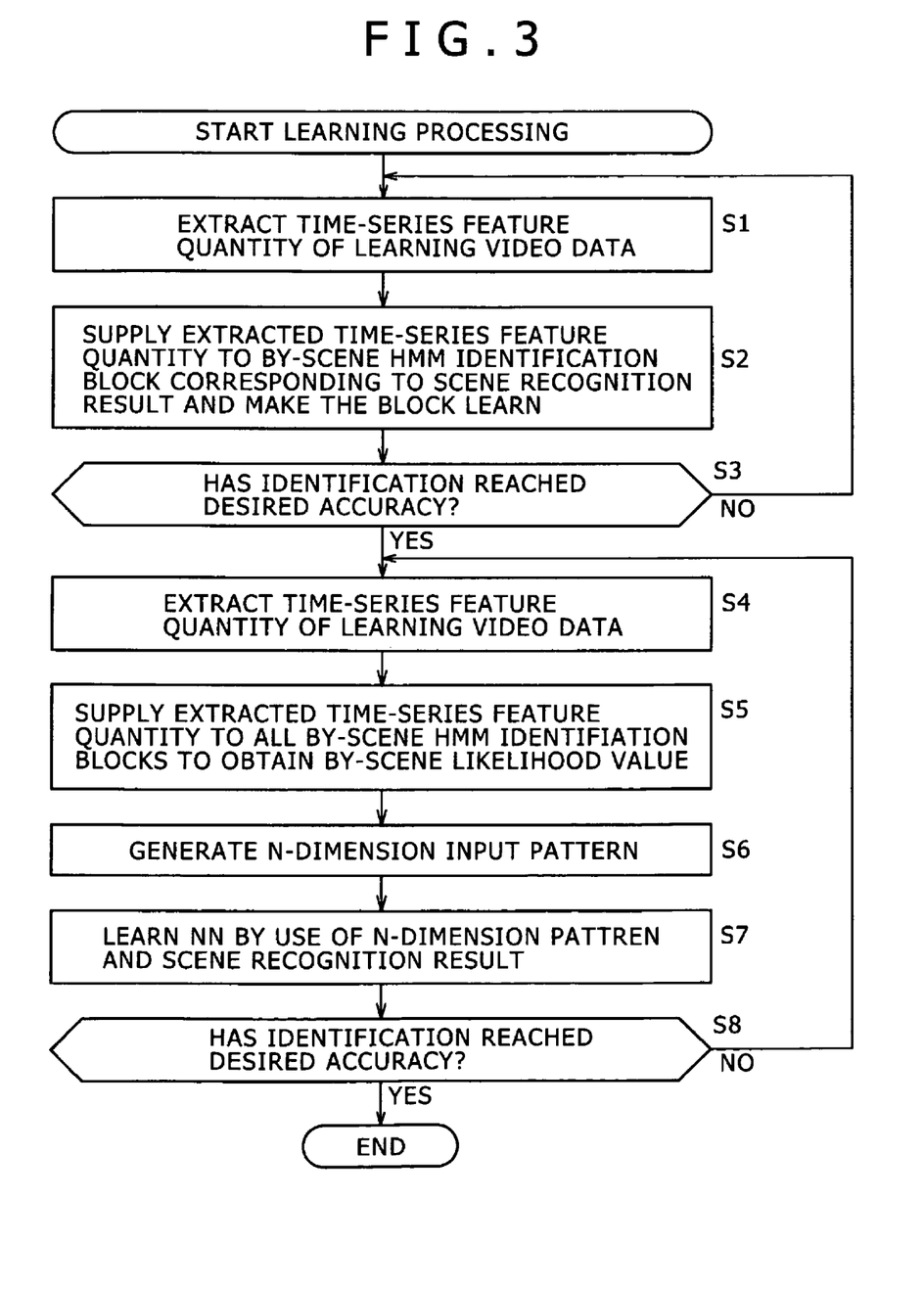
FIG. 3 is a flowchart indicative of learning processing corresponding to the video data identification apparatus shown in FIG. 1.

The following describes the previous learning processing for the video data identification apparatus 10 to be able to identify video data scenes more accurately, with reference to a flowchart shown in FIG. 3.

First, in steps S1 through S3, the by-scene HMM identification blocks 22-1 through 22-N of the time-series identification section 11 are learned.

To be more specific, in step S1, the time-series feature quantity extraction block 41 of the time-series learning apparatus 40 divides the learning video data into predetermined intervals to extract a time-series feature quantity of each interval and outputs the extracted time-series feature quantities to the selector 43.

In step S2, in response to a result of scene identification made by the user through the operator block 42, the selector 43 supplies the time-series feature quantity supplied from the time-series feature quantity extraction block 41 to one of the by-scene HMM learning blocks 44-1 through 44-N. On the basis of the time-series feature quantity supplied from the selector 43, the by-scene HMM learning blocks 44-1 through 44-N learn HMM.

In step S3, it is determined whether the identification by the by-scene HMM learning blocks 44-1 through 44-N has reached a desired accuracy. Until a desired accuracy is reached, the processes of steps S1 through S3 are repeatedly executed. If the identification by the by-scene HMM learning blocks 44-1 through 44-N is found reaching a desired accuracy in step S3, the final HMM of the by-scene HMM learning blocks 44-1 through 44-N is applied to the by-scene HMM identification blocks 22-1 through 22-N of the time-series identification section 11 shown in FIG. 1. Then, the procedure goes to step S4.

In steps S4 through S8, the scene decision block 32 of the pattern identification section 12 is learned.

To be more specific, in step S4, a time-series feature quantity is extracted from the learning video data and the extracted time-series feature quantity is supplied to the by-scene HMM identification blocks 22-1 through 22-N learned in the above-mentioned steps S1 through S3.

In step S5, the by-scene HMM identification blocks 22-1 through 22-N compute likelihood values that the supplied time-series feature quantities corresponds to supposed scenes and output the obtained likelihood values to the input pattern generating block 31. In step S6, the input pattern generating block 31 generates an N-dimension input patterns on the basis of N likelihood values entered from the by-scene HMM identification blocks 22-1 through 22-N and outputs the generated N-dimension input patterns to the scene decision block 32.

In step S7, the scene decision block 32 learns NN on the basis of the N-dimension input patterns supplied from the input pattern generating block 31 and the result of the scene identification by the operator who viewed the learning video data.

In step S8, it is determined whether the identification by the scene decision block 32 has reached a desired accuracy or not. The processes of steps S4 through 8 are repeatedly executed until a desired accuracy is reached. If the identification by the scene decision block 32 is found reaching a desired accuracy in step S8, then the learning processing comes to an end.

Figure 4:
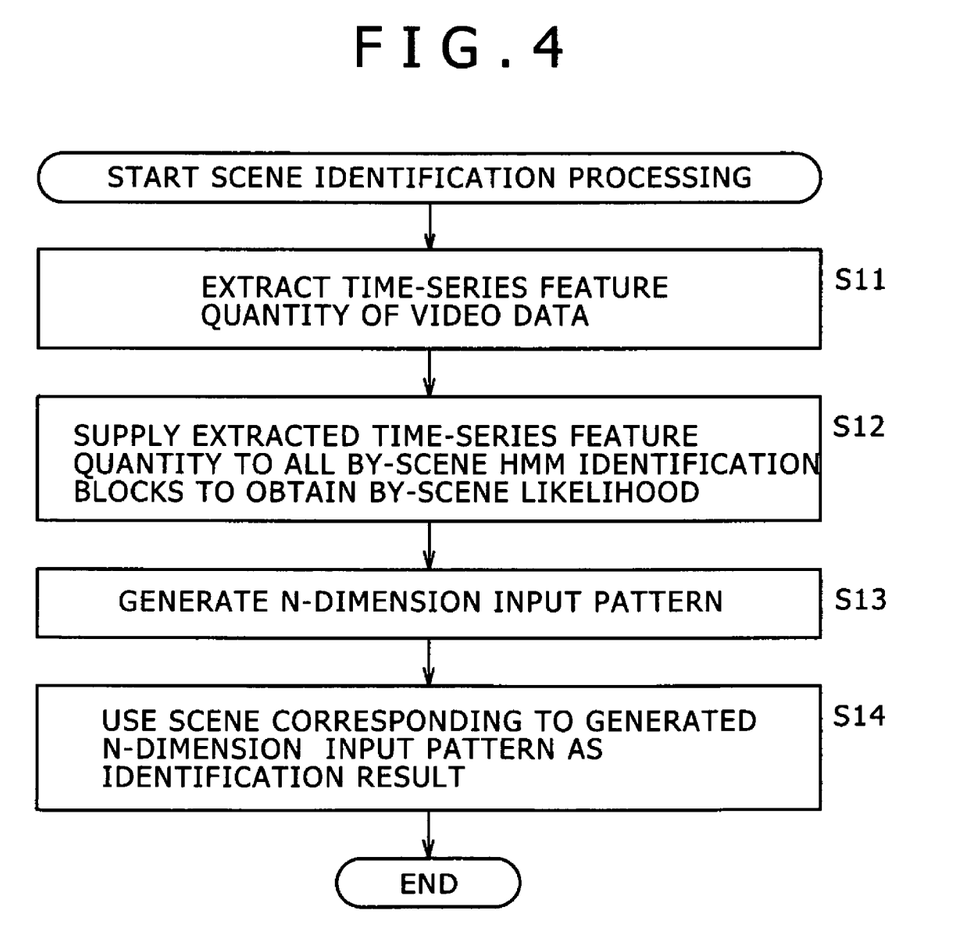
FIG. 4 is a flowchart indicative of scene identification processing to be executed by the video data identification apparatus shown in FIG. 1.

The following describes video data scene identification processing by the video data identification apparatus 10 including the by-scene HMM identification blocks 22-1 through 22-N and the scene decision block 32 that have been learned by the above-mentioned learning processing, with reference to a flowchart shown in FIG. 4.

In step S11, the time-series feature quantity extraction block 21 of the time-series identification section 11 divides the video data subject to processing into predetermined intervals to extract time-series feature quantities thereof. In step S12, the time-series feature quantity extraction block 21 supplies the extracted time-series feature quantities to the by-scene HMM identification blocks 22-1 through 22-N. The by-scene HMM identification blocks 22-1 through 22-N compute the likelihood value that the supplied time-series feature quantities are of the corresponding scenes (pitching scene, homerun scene, infield grounder scene, walking scene, strikeout scene, and so on). The obtained likelihood values are supplied to the input pattern generating block 31 of the pattern identification section 12.

In step S13, the input patterns generating block 31 generates an N-dimension input patterns on the basis of the N likelihood values entered from the by-scene HMM identification blocks 22-1 and 22-N of the time-series identification section 11 and outputs the generated N-dimension input patterns.

In step S14, the scene decision block 32 computes a likelihood value of each of the N-types of scenes of the N-dimension input patterns entered from the input patterns generating block 31 and outputs a scene corresponding to the greatest value of the obtained likelihood values as a video content identification result.

Thus, the scene identification processing by the video data identification apparatus 10 has been described. As described, the video data identification apparatus 10 identifies video data scenes not by use of HMM, but by the pattern decision based N likelihood value patterns outputted from two or more HMMs, so that chances of error decision can be reduced, thereby enhancing the accuracy of identification.

Figure 5:
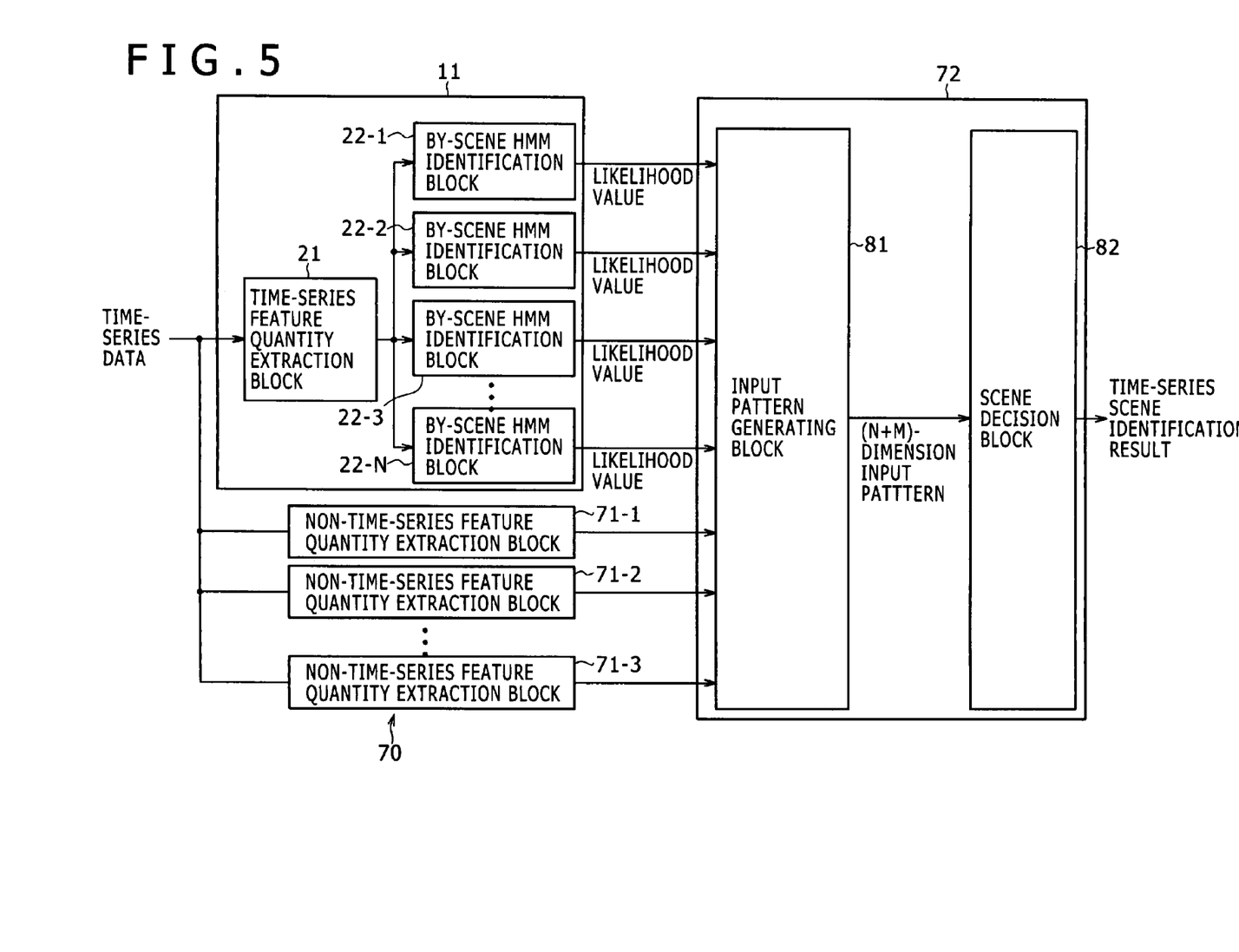
FIG. 5 is a block diagram illustrating a second exemplary configuration of a video data identification apparatus practiced as one embodiment of the invention.

The following describes an exemplary configuration of the video data identification apparatus practiced as a second embodiment of the invention. This video identification apparatus 70 is made up of substantially the same time-series identification section 11 of the video data identification apparatus 10 shown in FIG. 1, non-time-series feature extraction blocks 71-1 through 71-N configured to extract non-time-series feature quantities from video data subject to processing, and a pattern identification section 72.

The non-time-series feature quantity extraction blocks 71-1 through 71-N divides the video data subject to processing into predetermined intervals (for example, several seconds or several frames), extracts a representative image pattern, a representative color, a representative object on the screen, and so on, as non-time-series feature quantities, and outputs the extracted information to the pattern identification section 72.

The pattern identification section 72 executes pattern identification by use of NN, for example, and is made up of an input pattern generating block 81 and a scene decision block 82.

The input pattern generating block 81 generates (N+M)-dimension input patterns on the basis of N likelihood values entered from the by-scene HMM identification blocks 22-1 through 22-N of the time-series identification section 11 and M non-time-series feature quantities entered from the non-time-series feature quantity extraction blocks 71-1 through 71-M and outputs the generated input patterns to the scene decision block 82. The scene decision block 82 learned in advance computes the likelihood values of N-types of scenes of the (N+M) input patterns entered from the input pattern generating block 81 and outputs the scene corresponding to the greatest value of the obtained likelihood values as a video contents identification result. It should be noted that the learning of scene decision block 82 can be executed by a back propagation algorithm, for example, by use of learning video data (with time-series scenes identified by man).

Figure 6:
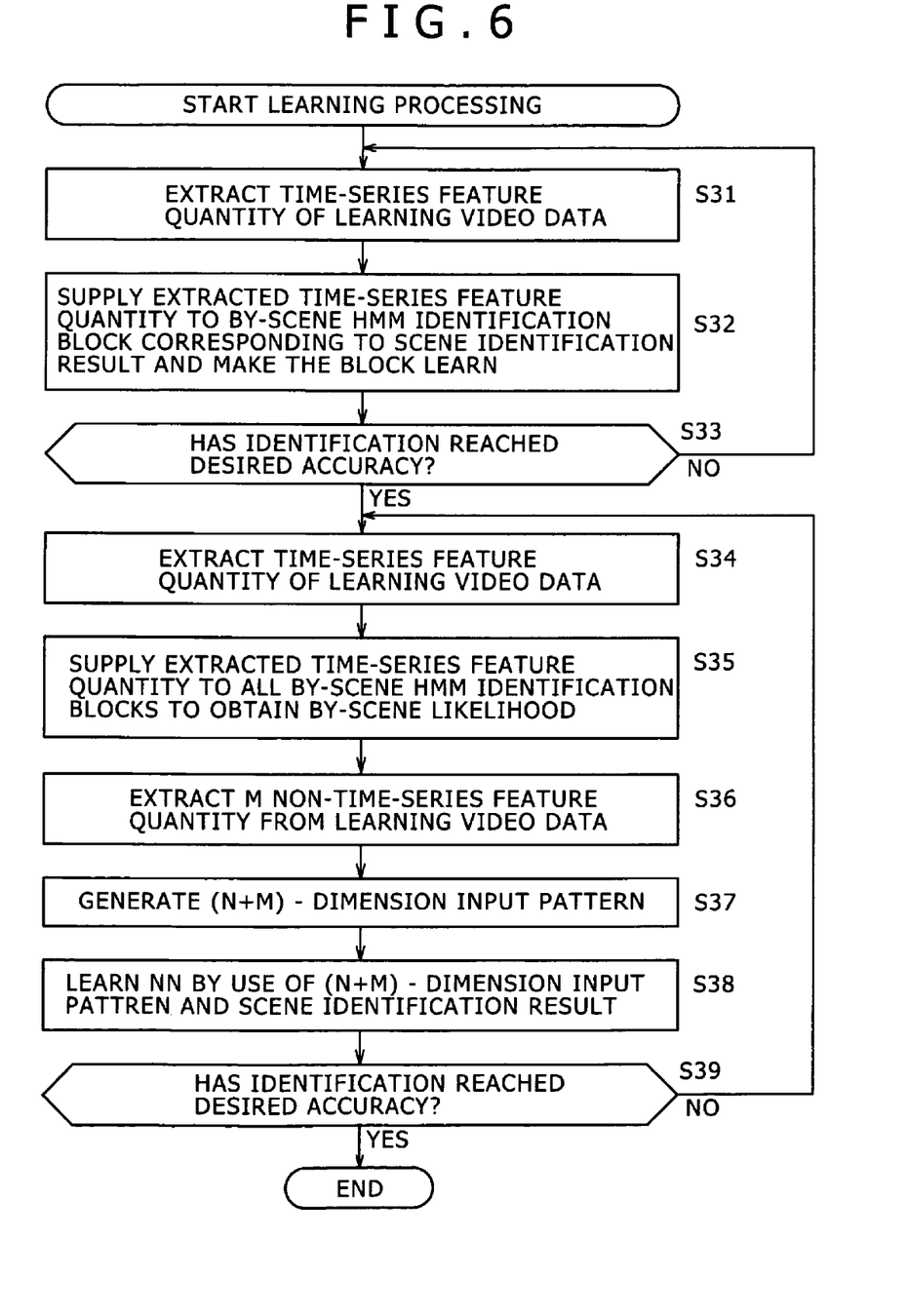
FIG. 6 is a flowchart indicative of learning processing of the video data identification apparatus shown in FIG. 5.

The following describes the learning processing to be executed in advance so as for the video identification apparatus 70 to identify video data scenes more accurately, with reference to a flowchart shown in FIG. 6.

First, like the processes of step S1 through S3 shown in FIG. 6 above, the by-scene HMM identification blocks 22-1 through 22-N of the time-series identification section 11 are learned by the processes of steps S31 through S33.

Next, in steps S34 through 39, the scene decision block 82 of the pattern identification section 72 is learned.

To be more specific, in step S34, a time-series feature quantity is extracted from the learning video data and the extracted time-series feature quantity is supplied to the by-scene HMM identification blocks 22-1 through 22-N learned in steps S31 through S33.

In step S35, the by-scene HMM identification blocks 22-1 through 22-N compute a likelihood value that the supplied time-series feature quantities correspond to supposed scenes and outputs the obtained likelihood value to the input pattern generating block 81 of the pattern identification section 72.

In step S36, the non-time-series feature quantity extraction blocks 71-1 through 71-M divide the learning video data into predetermined intervals to extract non-time-series feature quantities thereof and outputs the extracted non-time-series feature quantities to the input pattern generating block 81 of the pattern identification section 72.

In step S37, the input pattern generating block 81 generates (N+M)-dimension input patterns on the basis of the N likelihood values entered from the by-scene HMM identification blocks 22-1 through 22-N and the non-time-series feature quantity extraction blocks 71-1 through 71-M and outputs the generated input patterns to the scene decision block 82.

In step S38 the scene decision block 82 learns NN on the basis of the (N+M)-dimension input patterns entered from the input pattern generating block 81 and the result of the scene identification by the operator who viewed the learning video data.

In step S39, it is determined whether the identification by the scene decision block 82 has reached a desired accuracy or not. The processes of steps S34 through S39 are repeatedly executed until a desired accuracy is reached. If the identification by the scene decision block 82 is found reaching a desired accuracy in step S39, then this learning processing comes to an end.

Figure 7:
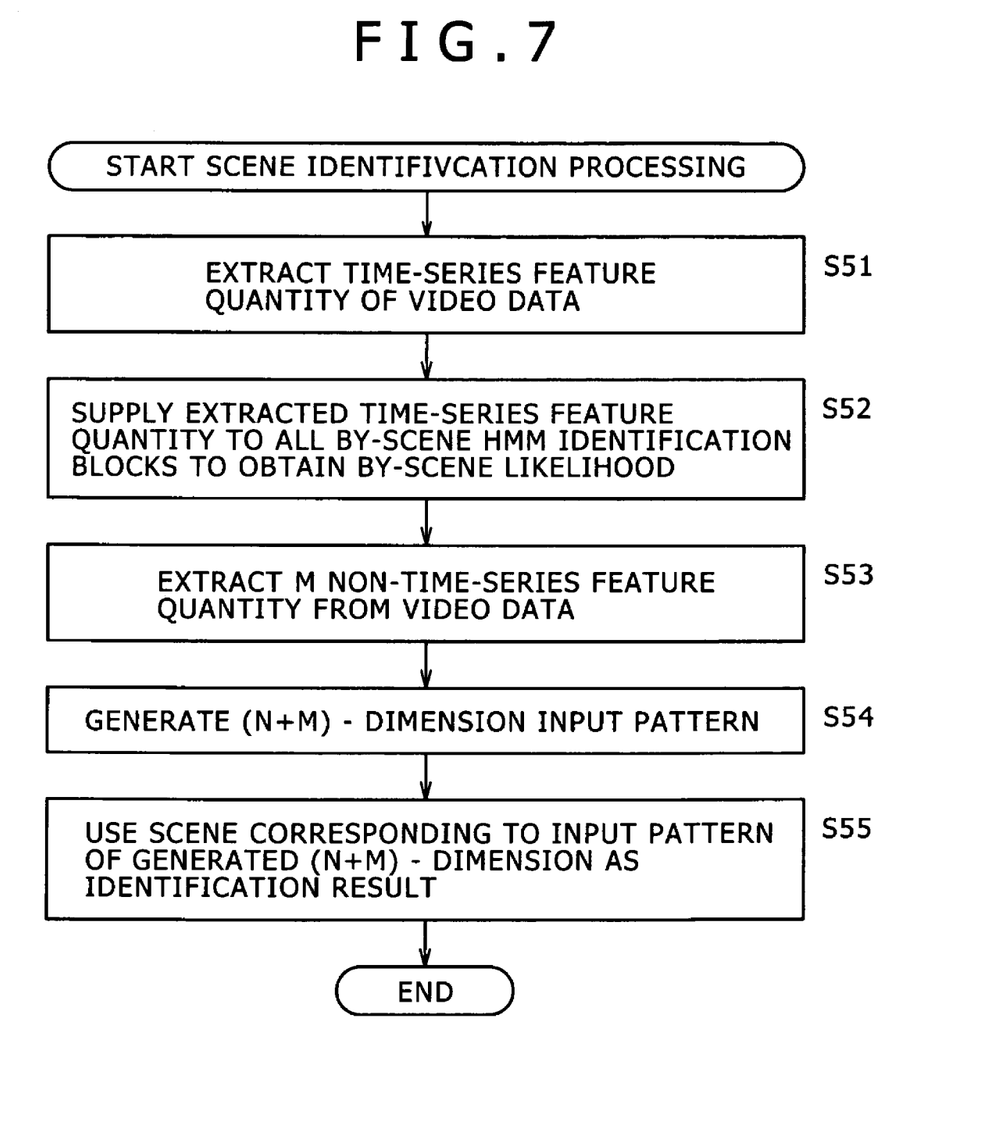
FIG. 7 is a flowchart indicative of scene identification processing to be executed by the video data identification apparatus shown in FIG. 5.

The following describes video data scene identification processing to be executed by the video data identification apparatus 70 including the by-scene HMM identification block 22-1 through 22-N and the scene decision block 82 that have been learned by the above-mentioned learning processing, with reference to a flowchart shown in FIG. 7.

In step S51, the time-series feature quantity extraction block 21 of the time-series identification section 11 divides the video data subject to processing into predetermined intervals to extract time-series feature quantities thereof. In step S52, the time-series feature quantity extraction block 21 supplies the extracted time-series feature quantities to the by-scene HMM identification blocks 22-1 through 22-N. The by-scene HMM identification block 22-1 through 22-N compute the likelihood value that the supplied time-series feature quantities are those of corresponding scenes (a pitching scene, a homerun scene, an infield grounder scene, a walking scene, a strikeout scene, and so on). The obtained likelihood value is supplied to the input pattern generating block 81 of the pattern identification section 72.

In step 53, the non-time-series feature quantity extraction blocks 71-1 through 7-M divide the video data subject to processing into predetermined intervals to extract non-time-series feature quantities hereof and outputs the extracted non-time-series feature quantities to the input pattern generating block 81.

In step S54, the input pattern generating block 81 generates (N+M)-dimension patterns on the basis of N likelihood values entered from the by-scene HMM identification blocks 22-1 through 22-N and M non-time-series feature quantities entered from the non-time-series feature quantity extraction blocks 71-1 through 71M and outputs the generated patterns to the scene decision block 82.

In step S55, the scene decision block 82 computes the likelihood values of the N-types of scenes of the (N+M)-dimension input patterns entered from the input pattern generating block 81 and outputs the scene corresponding to the greatest value of the obtained likelihood values as a video contents identification result.

Thus, the scene identification processing executed by the video data identification apparatus 70 has been described. As described, the video data identification apparatus 10 identifies video data scenes not by use of HMM, but by the pattern decision based on the patterns of N likelihood values and M non-time-series feature quantities outputted from the HMMs, so that the chances of erroneous identification can be reduced as compared with the identification based on only HMM, thereby enhancing the accuracy of identification. The above-mentioned novel configuration also allows the scene identification by use of non-time-series feature quantities.

As described above, HMM is used for the time-series identification section 11 in the above-mentioned embodiments of the invention; however, it is also practicable to use other probabilistic models other than HMM. As described above, NN is used for the pattern identification section 12 and the pattern identification section 72; however it is also practicable to use other pattern recognition algorithm than NN.

It should be noted that the embodiments of the present invention is applicable to not only the scene identification of video data, but also the classification of time-series data of given types.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

Figure 8:
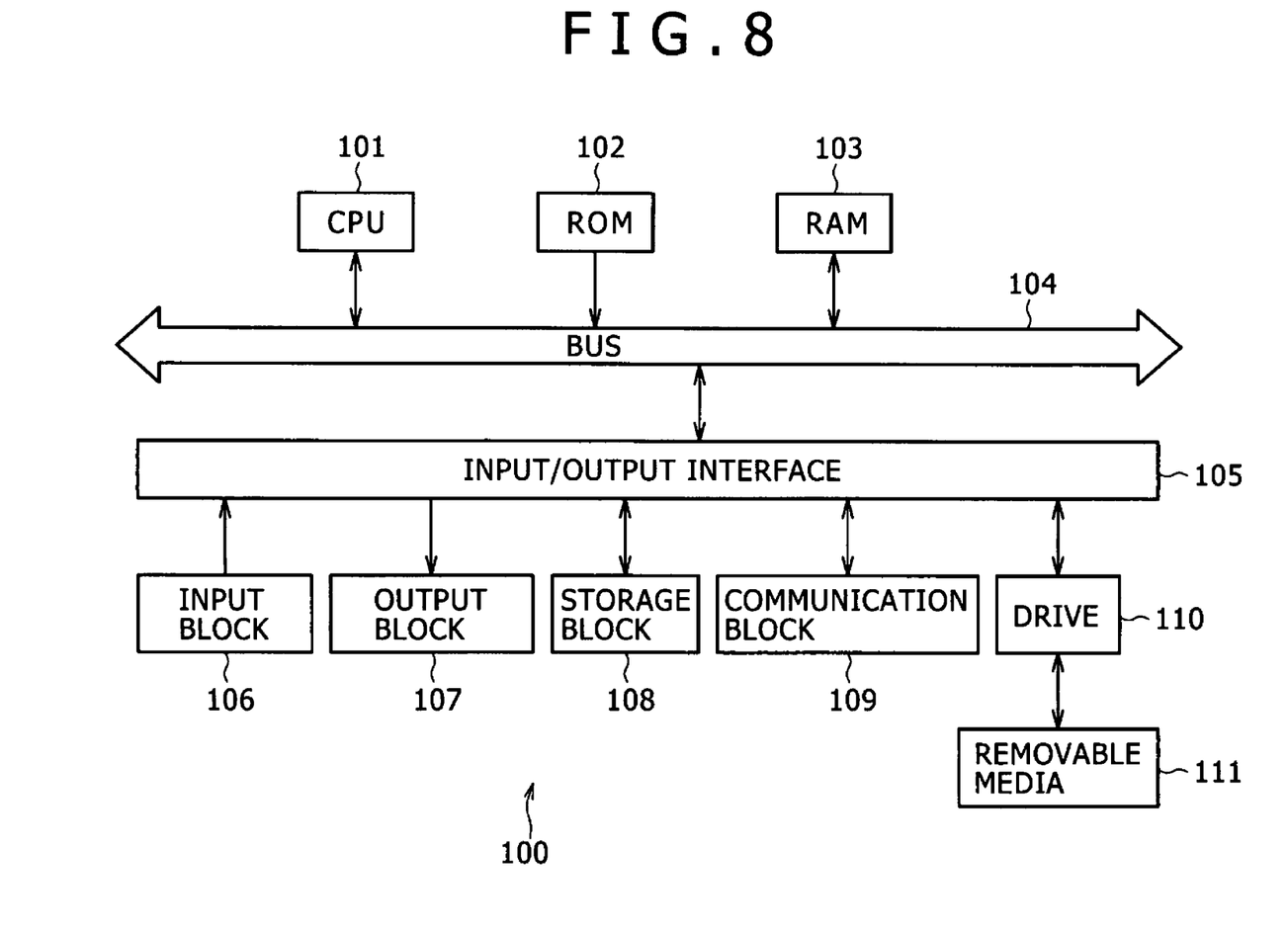
FIG. 8 is a block diagram illustrating an exemplary configuration of a general-purpose computer.

Referring to FIG. 8, there is shown a block diagram illustrating an exemplary hardware configuration of a computer configured to execute the above-mentioned sequence of processing operations by software programs.

In this computer 100, a CPU (Central Processing Unit) 101, a ROM (Read Only Memory) 102, a RAM (Random Access Memory) 103 are interconnected by a bus 104.

The bus 104 is further connected to an input/output interface 105. The input/output interface 105 is connected to an input block 106 having a keyboard, a mouse, a microphone, and so on, an output block 107 having a display monitor, a loudspeaker, and so on, a storage block 108 based on hard disk or a nonvolatile memory, a communication block 109 based on a network interface, and a drive 110 for driving a removable media 111, such as a magnetic disk, an optical disk, a magneto-optical disk, or a semiconductor memory, for example.

In the computer 100 thus configured, the CPU 101 loads programs stored in the storage 108 into the RAM 103 via the input/output interface 105 and the bus 104 so as to execute the above-mentioned sequence of processing operations, for example.

It should be noted herein that the steps for describing each program recorded in recording media include not only the processing operations which are sequentially executed in a time-dependent manner but also the processing operations which are executed concurrently or discretely.

It should also be noted that programs may be executed by a single unit of computer or two or more units of computer in a distributed manner or transferred to a remote computer for execution.

While preferred embodiments of the present invention have been described using specific terms, such description is for illustrative purpose only, and it is to be understood that changes and variations may be made without departing from the spirit or scope of the following claims.

What is claimed is:

1. An information processing apparatus configured to classify time-series input data into N classes, comprising:
   time-series feature quantity extracting means for extracting a time-series feature quantity of said time-series input data;
   N calculating means for calculating, by applying said extracted time-series feature quantity to a probabilistic model learned in advance, likelihood values that said time-series input data belongs to any one of said N classes; and
   determination means for determining, by applying one of patterns of N dimension and dimensions higher than N that includes the calculated N likelihood values to pattern identification sections learned in advance, whether said time-series input data belong to any one of said N classes.

2. The information processing apparatus according to claim 1, wherein said time-series input data is video data and said N classes are scenes of N different types that are video contents of said video data.

3. The information processing apparatus according to claim 1, further comprising:
   non-time-series feature quantity extracting means for extracting a non-time-series feature quantity of said time-times input data; wherein
   said determination means, by applying (N+M)-dimension patterns including the N calculated likelihood values and M extracted non-time-series feature quantities to a pattern identification section learned in advance, determines whether said time-series input data belongs to which of said N classes.

4. The information processing apparatus according to claim 1, wherein said probabilistic model is a Hidden Markov Model and said pattern identification section is a neural network.

5. An information processing method for an information processing apparatus configured to classify time-series input data into N classes, comprising the steps of:
   extracting a time-series feature quantity of said time-series input data;
   calculating, by applying said extracted time-series feature quantity to a probabilistic model learned in advance, likelihood values that said time-series input data belongs to any one of said N classes; and
   determining, by applying one of patterns of N dimension and dimensions higher than N that includes the calculated N likelihood values to pattern identification sections learned in advance, whether said time-series input data belongs to which of said N classes.

6. A program for controlling an information processing apparatus configured to classify time-series input data into N classes, comprising the steps of:
   extracting a time-series feature quantity of said time-series input data;
   calculating, by applying said extracted time-series feature quantity to a probabilistic model learned in advance, likelihood values that said time-series input data belongs to any one of said N classes; and
   determining, by applying one of patterns of N dimension and dimensions higher than N that includes the calculated N likelihood values to pattern identification sections learned in advance, whether said time-series input data belongs to which of said N classes.

7. An information processing apparatus configured to classify time-series input data into N classes, comprising:
   a time-series feature quantity extracting section configured to extract a time-series feature quantity of said time-series input data;
   N calculating sections configured to calculate, by applying said extracted time-series feature quantity to a probabilistic model learned in advance, likelihood values that said time-series input data belongs to any one of said N classes; and
   a determination section configured to determine, by applying one of patterns of N dimension and dimensions higher than N that includes the calculated N likelihood values to pattern identification sections learned in advance, whether said time-series input data belong to any one of said N classes.

* * * * *